United States Patent
Park et al.

(10) Patent No.: US 12,413,317 B2
(45) Date of Patent: Sep. 9, 2025

(54) APPARATUS AND METHOD FOR ERROR CORRECTION IN WIRELESS COMMUNICATION SYSTEM

(71) Applicants: SAMSUNG ELECTRONICS CO., LTD., Suwon-si (KR); POSTECH RESEARCH AND BUSINESS DEVELOPMENT FOUNDATION, Pohang-si (KR)

(72) Inventors: Hyunchul Park, Suwon-si (KR); Ho-Jin Song, Pohang-si (KR); Seunguk Choi, Pohang-si (KR); Yonghoon Kim, Suwon-si (KR); Donggyu Minn, Suwon-si (KR); Yuichi Aoki, Suwon-si (KR)

(73) Assignees: SAMSUNG ELECTRONICS CO., LTD., Suwon-si (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 440 days.

(21) Appl. No.: 17/890,091

(22) Filed: Aug. 17, 2022

(65) Prior Publication Data
US 2022/0399944 A1    Dec. 15, 2022

Related U.S. Application Data

(63) Continuation of application No. PCT/KR2022/000769, filed on Jan. 14, 2022.

(30) Foreign Application Priority Data

Jan. 15, 2021    (KR) .................. 10-2021-0006349

(51) Int. Cl.
*H04B 17/12* (2015.01)
*H04B 17/10* (2015.01)

(52) U.S. Cl.
CPC ........... *H04B 17/12* (2015.01); *H04B 17/102* (2015.01)

(58) Field of Classification Search
CPC .............................. H04N 17/102; H04L 12/28
USPC ........................................ 370/328, 400, 403
See application file for complete search history.

(56) References Cited

U.S. PATENT DOCUMENTS

| | | | |
|---|---|---|---|
| 8,019,285 | B2 | 9/2011 | Nakamura |
| 9,408,215 | B2 | 8/2016 | Negus |

(Continued)

FOREIGN PATENT DOCUMENTS

| | | |
|---|---|---|
| JP | 2002-111560 | 4/2002 |
| JP | 2008085926 | 4/2008 |

(Continued)

OTHER PUBLICATIONS

Yuuichi Aoki, et al., "Inter-Stream Loopback Calibration for 5G Phased-Array Systems", 2020 IEEE Radio Frequency Integrated Circuits Symposium, downloaded Nov. 3, 2020, pp. 359-362.

(Continued)

*Primary Examiner* — Dang T Ton
(74) *Attorney, Agent, or Firm* — NIXON & VANDERHYE P.C.

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An electronic device, in a wireless communication system, may include: a processor, an antenna array, a plurality of first radio frequency (RF) paths related to a first stream, the first RF paths each including a transmit (TX) path and a receive (RX) path, and a plurality of second RF paths related to a second stream, the second RF paths each including a TX path and an RX path, and the processor may be configured (Continued)

to: generate a calibration signal for the antenna array, obtain characteristic information of the antenna array based on a phase difference or a gain difference between one TX path having the first stream and one RX path having the second stream obtained for each of measurement RF paths among the plurality of the first RF paths, and calibrate the plurality of the first RF paths based on the characteristic information.

12 Claims, 10 Drawing Sheets

(56) References Cited

U.S. PATENT DOCUMENTS

| | | | |
|---|---|---|---|
| 9,923,524 | B2 | 3/2018 | Carbone et al. |
| 10,230,446 | B2 | 3/2019 | Sun et al. |
| 10,506,611 | B2 | 12/2019 | Negus et al. |
| 11,323,146 | B2 | 5/2022 | Na |
| 2002/0048286 | A1 | 4/2002 | Brunel |
| 2006/0279459 | A1 | 12/2006 | Akiyama et al. |
| 2007/0069945 | A1 | 3/2007 | Weese |
| 2009/0191819 | A1 | 7/2009 | Chae et al. |
| 2010/0056083 | A1 | 3/2010 | Kim et al. |
| 2011/0102241 | A1* | 5/2011 | Stewart ............... G01S 13/583 342/104 |
| 2013/0057447 | A1 | 3/2013 | Pivit et al. |
| 2015/0255868 | A1 | 9/2015 | Haddad et al. |
| 2017/0012349 | A1 | 1/2017 | Lee et al. |
| 2017/0201310 | A1 | 7/2017 | Nardozza |

FOREIGN PATENT DOCUMENTS

| | | |
|---|---|---|
| JP | 2019052976 | 4/2019 |
| KR | 10-2009-0081753 | 7/2009 |
| KR | 10-2012-0064511 | 6/2012 |
| KR | 10-2012-0136395 | 12/2012 |
| KR | 10-2017-0022938 | 3/2017 |
| KR | 10-2019-0114268 | 10/2019 |
| WO | 2021/141434 | 7/2021 |

OTHER PUBLICATIONS

D. Dal Maistro, et al., "A 24.2-30.5GHZ Quad-Channel RFIC for 5G Communications including Built-In Test Equipment", 2019 IEEE Radio Frequency Integrated Circuits Symposium, downloaded Aug. 12, 2022, pp. 283-286.

J.D. Dunworth, et al., "A 28GHz Bulk-CMOS Dual-Polarization Phased-Array Transceiver with 24 Channels for 5G User and Basestation Equipment", 2018 IEEE International Solid-State Circuits Conference, Feb. 12, 2018, 3 pages.

Ozgur Inac, et al., "A Phased Array RFIC With Built-In Self-Test Capabilities", IEEE Transactions on Microwave Theory and Techniques, vol. 60, No. 1, Jan. 2012, pp. 139-148.

Sung-Man Kim, "A New RF-path Calibration Method for BSs with Repeaters", The Journal of the Korea institute of electronic communication sciences, vol. 6, Issue 2, published Apr. 30, 2011, 7 pages.

Jian Pang, et al., "A 28-GHz CMOS Phased-Array Beamformer Utilizing Neutralized Bi-Directional Technique Supporting Dual-Polarized MIMO for 5G NR", IEEE Journal of Solid-State Circuits, vol. 55, No. 9, Sep. 2020, pp. 2371-2386.

H.C. Park, et al., "A 39GHz-Band CMOS 16-Channel Phased-Array Transceiver IC with a Companion Dual-Stream IF Transceiver IC for 5G NR Base-Station Applications", 2020 IEEE International Solid-State Circuits Conference, Feb. 17, 2020, 3 pages.

Bodhisatwa Sadhu, et al., "A 28-GHz 32-Element TRX Phased-Array IC With Concurrent Dual-Polarized Operation and Orthogonal Phase and Gain Control for 5G Communications", IEEE Journal of Solid-State Circuits, vol. 52, No. 12, Dec. 2017, pp. 3373-3391.

Alberto Valdes-Garcia, et al., "A Fully-Integrated Dual-Polarization 16-Element W-band Phased-Array Transceiver in SiGe BiCMOS", 2013 IEEE Radio Frequency Integrated Circuits Symposium, Jun. 2013, 5 pages.

Yun Wang, et al., "A 39GHz 64-Element Phased-Array CMOS Transceiver with Built-in Calibration for Large-Array 5G NR", 2019 IEEE Radio Frequency Integrated Circuits Symposium. Downloaded Aug. 12, 2022, pp. 279-282.

Internatioanl Search Report for PCT/KR2022/000769 dated May 11, 2022, 6 pages.

Written Opinion of the ISA for PCT/KR2022/000769 dated May 11, 2022, 4 pages.

Extended European Search Report dated May 10, 2024 issued in European Patent Application No. 22739787.4.

European Office Action issued Oct. 2, 2024 in corresponding European Patent Application No. 22739787.4.

Office Action for EP Application No. 22739787.4 dated Apr. 11, 2025, 5 pages.

* cited by examiner

APPARATUS AND METHOD FOR ERROR CORRECTION IN WIRELESS COMMUNICATION SYSTEM

CROSS-REFERENCE TO RELATED APPLICATIONS

This application is a continuation of International Application No. PCT/KR2022/000769 designating the United States, filed on Jan. 14, 2022, in the Korean Intellectual Property Receiving Office and claiming priority to Korean Patent Application No. 10-2021-0006349, filed on Jan. 15, 2021, in the Korean Intellectual Property Office, the disclosures of which are incorporated by reference herein in their entireties.

BACKGROUND

Field

The disclosure relates to a wireless communication system, and for example, to an apparatus and a method for error correction in the wireless communication system.

Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Products equipped with a plurality of antennas are being developed to increase communication performance, and it is expected to use equipment having much more antennas by utilizing the massive MIMO technique. Since the number of antenna elements increases in a communication device and a gain error or a phase error may occur between chains in a radio frequency integrated circuit (RFIC), and a solution for calibrating such an error is demanded.

SUMMARY

Embodiments of the disclosure provide an apparatus and a method for controlling gain and phase errors in a wireless communication system.

Embodiments of the disclosure provide a calibration circuit for improving efficiency of a fifth generation (5G) radio frequency integrated circuit (RFIC) in a wireless communication system.

Embodiments of the disclosure provide an apparatus and a method for self-correcting an error, by measuring a gain and a phase through a connection of a transmit path and a receive path in a wireless communication system.

According to an example embodiment of the present disclosure, an electronic device, in a wireless communication system, may include: a processor, an antenna array, a plurality of first radio frequency (RF) paths related to a first stream, the first RF paths each including a transmit (TX) path and a receive (RX) path, and a plurality of second RF paths related to a second stream, the second RF paths each including a TX path and an RX path, and the processor may be configured to: generate a calibration signal for the antenna array, obtain characteristic information of the antenna array based on a phase difference or a gain difference between one TX path of the first stream and one RX path of the second stream, obtained for each of measurement RF paths among the plurality of the first RF paths, and calibrate the plurality of the first RF paths based on the characteristic information.

According to an example embodiment of the present disclosure, a method of operating an electronic device, in a wireless communication system, may include: generating a calibration signal for an antenna array, the antenna array connected with a plurality of first RF paths related to a first stream and a plurality of second RF paths related to a second stream, the first RF paths each including a transmit (TX) path and an receive (RX) path, the second RF paths each including a TX path and an RX path, obtaining characteristic information of the antenna array based on a phase difference or a gain difference between one TX path of the first stream and one RX path of the second stream, obtained for each of measurement RF paths among the plurality of the first RF paths, and calibrating the plurality of the first RF paths based on the characteristic information.

An apparatus and a method according to various example embodiments of the present disclosure, may correct a gain error and a phase error in a radio frequency integrated circuit (RFIC), by measuring a gain and a phase through a connection of a transmit path and a receive path having different polarizations.

An apparatus and a method according to various example embodiments of the present disclosure, may correct a gain error and a phase error in real time during operations, by sequentially measuring a gain and a phase, through a connection of a transmit path and a receive path having different polarizations.

An apparatus and a method according to various example embodiments of the present disclosure, may achieve product miniaturization, by correcting a gain error and a phase error in an RFIC without a separate calibration circuit.

Effects obtainable from the present disclosure are not limited to the above-mentioned effects, and other effects which are not mentioned may be clearly understood by those skilled in the art of the present disclosure through the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
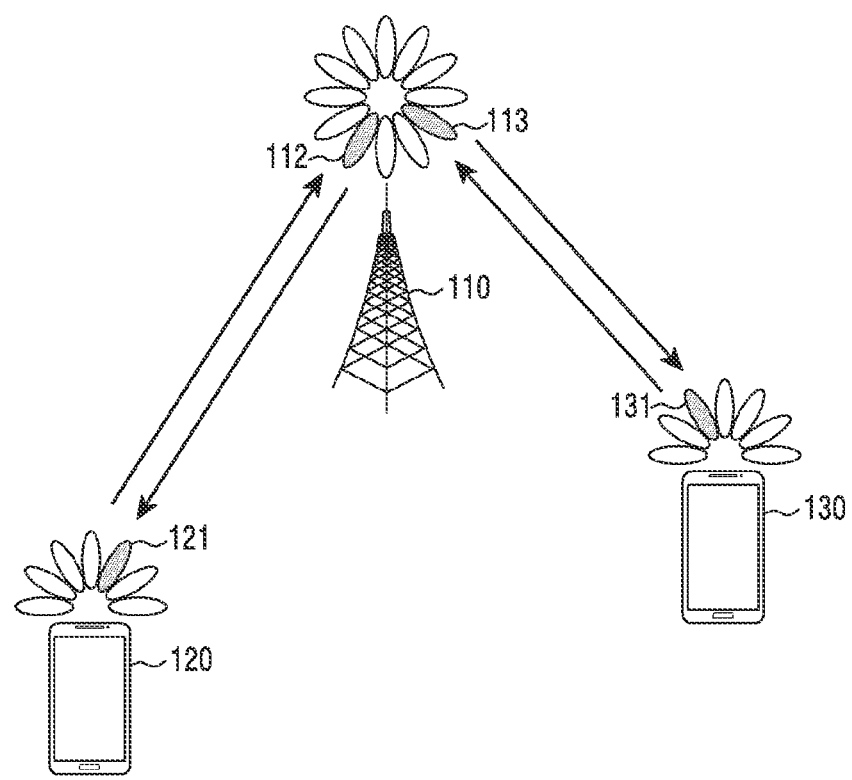
FIG. 1A is a diagram illustrating an example wireless communication system according to various embodiments.

Terms used in the present disclosure are used for describing various embodiments, and are not intended to limit the scope of the various example embodiments. A singular expression may include a plural expression, unless they are definitely different in a context. All terms used herein, including technical and scientific terms, may have the same meaning as those commonly understood by a person skilled in the art of the present disclosure. Terms defined in a generally used dictionary among the terms used in the present disclosure may be interpreted to have the meanings equal or similar to the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

Various embodiments of the present disclosure to be described below explain a hardware approach by way of example. However, since the various embodiments of the present disclosure include a technology using both hardware and software, various embodiments of the present disclosure do not exclude a software-based approach.

Terms indicating circuits of an electronic device (e.g., a printed circuit board (PCB), a flexible PCB (FPCB), a signal line, a feeding line, a data line, a radio frequency (RF) signal line, an antenna line, an RF path, an RF module, an RF circuit), terms indicating electronic parts (e.g., a processor, a chip, a component, a device), terms indicating switches, terms indicating RF components (an RF chain, an RFIC, an RF unit), terms indicating antennas (e.g., an antenna module, an antenna element, an antenna, an antenna circuit), terms indicating component shapes (e.g., a structure body, a structure, a support portion, a contact portion, a protrusion portion, and an opening portion), and terms indicating connection units between structures (e.g., a connection portion, a contact portion, a support portion, a contact structure, a conductive member, an assembly) used in the following explanations may be used by way of example for convenience of description. Accordingly, the present disclosure is not limited to terms to be described, and other terms having equivalent technical meanings may be used. In addition, terms such as ' . . . unit', ' . . . er' ' . . . structure', and '. . . body' used herein may indicate at least one shape structure or a unit for processing a function.

In the present disclosure, to determine whether a specific condition is satisfied or fulfilled, expressions such as greater than or less than are used by way of example and do not exclude expressions such as greater than or equal to or less than or equal to. A condition described with 'greater than or equal to' may be replaced by 'greater than', a condition described with 'less than or equal to' may be replaced by 'less than', and a condition described with 'greater than or equal to and less than' may be replaced by 'greater than and less than or equal to'.

The present disclosure may describe various example embodiments using terms used in some communication standard (e.g., 3rd generation partnership project (3GPP), institute of electrical and electronics engineers (IEEE)), which are merely examples for explanations. Various embodiments of the present disclosure may be easily modified and applied in other communication system.

The present disclosure relates to a calibration method and an electronic device for performing the same in a wireless communication system. For example, the present disclosure provides an apparatus and a method for efficiently performing calibration based on a gain error or a phase error in a phased-array RFIC, by combining RF paths of different polarizations, and conducting the calibration in a sequential or joint manner in the wireless communication system. The RFIC may, for example, be referred to as the phased-array RFIC including a phase shifter in each RF chain in the present disclosure, but other terms having the equivalent technical meaning may be alternatively used. For example, the RFIC may be referred to as an RF phased-array transceiver IC or a phased-array IC.

FIG. 1A is a diagram illustrating an example wireless communication system according to various embodiments. FIG. 1A illustrates a base station 110, a terminal 120, and a terminal 130, as some of nodes which use a radio channel in the wireless communication system. While FIG. 1A depicts only one base station, another base station which is identical or similar to the base station 110 may be further included.

The base station 110 may refer, for example, to a network infrastructure for providing radio access to the terminal 120. The base station 110 has coverage defined as a specific geographical area based on a signal transmission distance. The base station 110 may be referred to, for example, asa millimeter wave (mmWave) equipment, an 'access point (AP)', an 'eNodeB (eNB)', a '5th generation node (5G node)', a 5G Node B (NB), a 'wireless point', a 'transmission/reception point (TRP)', an 'access unit', a 'distributed unit (DU)', a 'TRP', a 'radio unit (RU)', a massive multiple input multiple output (MIMO) (MMU) unit', a 'remote radio head (RRH)' or other term having technically identical meaning. The base station 110 may transmit a downlink signal or receive an uplink signal.

The terminal 120 may refer, for example, to a device used by a user, and communicates with the base station 110 over a radio channel. In some cases, the terminal 120 may operate without user's involvement. For example, the terminal 120 may be a device which performs machine type communication (MTC), and may not be carried by the user. The terminal 120 may be referred to, for example, as a 'user equipment (UE)', a 'mobile station', a 'subscriber station', a 'customer premises equipment (CPE)', a 'remote terminal', a 'wireless terminal', an 'electronic device' or a 'vehicle terminal', a 'user device' or other term having technically equivalent meaning.

The terminal 120, and the terminal 130 shown in FIG. 1A may support vehicle communication. In the vehicle communication, standardization for vehicle-to-everything (V2X) technology has been completed in 3GPP Release 14 and Release 15 based on a device-to-device (D2D) communication structure in a long term evolution (LTE) system. Currently, efforts are underway to develop the V2X technology based on 5G new radio (NR). NR V2X supports terminal-to-terminal unicast communication, groupcast (or multicast) communication, and broadcast communication.

A polarization based calibration circuit structure and a calibration operation described in various example embodiments of the present disclosure explain operations and configuration of the base station, but embodiments of the present disclosure are not limited thereto. The polarization based calibration circuit structure and the equipment including the same suggested in the present disclosure may be implemented in the terminal as well as the base station. For example, the embodiments of the present disclosure may be used also in uplink transmission of the terminal, and sidelink communication of the terminal, as well as downlink transmission of the base station.

Figure 1B:
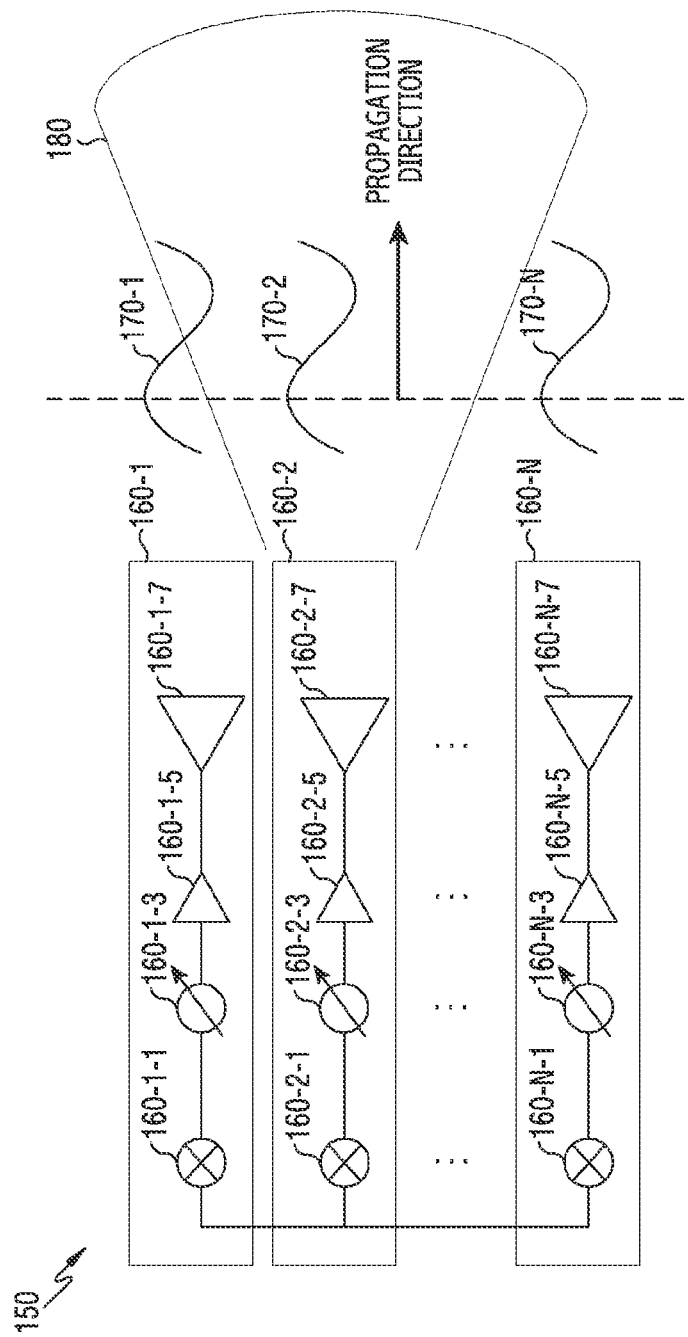
FIG. 1B is a diagram illustrating an example phased-array antenna according to various embodiments.

FIG. 1B is a diagram illustrating an example phased-array antenna according to various embodiments. The phased-array antenna may refer, for example, to an antenna in which an RF chain including a phase shifter is connected to each of antenna elements, to control a phase of each of the antenna elements included in the antenna array.

Referring to FIG. 1B, a phased-array antenna 150 includes a plurality of RF chains 160-1, 160-2 through 160-N. Hereafter, for convenience of explanation, configurations of the RF chain 160-1 and functions of the configurations are described, which are for convenience of explanation, and configurations of the other RF chains (e.g., the RF chains 160-2 through 160-N) may also perform identical or similar functions to the configurations of the RF chain 160-1.

A mixer 160-1-1 may convert a center frequency of an input signal, and output a signal having the converted center frequency. For example, the mixer 160-1-1 may convert an intermediate frequency (IF) signal into an RF signal, or convert an RF signal into an IF signal. Herein, the frequency of the RF signal may be expressed as a sum of the frequency of the IF signal and a frequency of a local oscillator (LO) signal, and by contrast, the frequency of the IF signal may be expressed by subtracting the LO signal frequency from the RF signal frequency. For doing so, the mixer 160-1-1 may be connected to an LO.

A phase shifter 160-1-3 may shift a phase of the input signal, and output a signal having the shifted phase. For example, the phase shifter 160-1-3 may lag the phase of the input signal, or advance the phase. One phase code of a plurality of phase codes may be set in the phase shifter 160-1-3. The plurality of the phase codes each may correspond to one of phases ranging from 0 degree to 360 degrees, and different phase codes may correspond to different phases respectively. For example, if available phase codes which may be set in the phase shifter 160-1-3 are 0 through 15 (e.g., 16 in number) in decimal, a phase corresponding to a phase code n may be $2\pi/16 \times n$. The number of the phase codes and the corresponding method between the phase codes and the phases as mentioned above are examples, and various modifications are possible. If a specific phase code is set in the phase shifter 160-1-3, the phase shifter 160-1-3 may shift the phase of the input to the phase shifter 160-1-3 to a phase corresponding to the set phase code, and output the signal of the shifted phase. The phase code may be set at the phase shifter 160-1-3 by a control signal for the phase shifter 160-1-3, and the phase code set at the phase shifter 160-1-3 may be changed to other phase code by the control signal for the phase shifter 160-1-3. According to various embodiments of the present disclosure, the phase code may be also referred to as a phase value, or a phase shifter (PS) code. In addition, setting the phase code at the phase shifter (e.g., the phase shifter 160-1-3) may be understood as setting the phase code at the RF chain (e.g., the RF chain 160-1) including the phase shifter.

An amplifier 160-1-5 may amplify the input signal. The amplifier 160-1-5 may provide the amplified signal to a radiator 160-1-7. The radiator 160-1-7 may convert the input electrical signal into an electromagnetic wave, and radiate the electromagnetic wave into a free pace.

A signal 170-1 may be transmitted from the RF chain 160-1 through the mixer 160-1-1, the phase shifter 160-1-3, the amplifier 160-1-5 and the radiator 160-1-7, or received by the RF chain 160-1 through the radiator 160-1-7, the amplifier 160-1-5, the phase shifter 160-1-3 and the mixer 160-1-1. Similarly, a signal 170-2 may be transmitted from the RF chain 160-2, or received by the RF chain 160-2, and a signal 170-N may be transmitted from the RF chain 160-N, or received by the RF chain 160-N.

If the phases of the signals 170-1 through 170-N transmitted or received by the plurality of the RF chains 160-1 through 160-N may be the same, the signals 170-1 through 170-N may form a plane wave as a whole. Through the phase control of the signals 170-1, 170-2 through 170-N transmitted or received by the plurality of the RF chains 160-1, 160-2 through 160-N, a beamforming gain formed by the signals 170-1, 170-2 through 170-N may be increased in a specific direction. Providing the high gain in the specific direction may be understood as forming a beam (e.g., a beam 130) of the specific direction. If the phase codes are set at the RF chains 160-1, 160-2 through 160-N such that the phases of the signals 170-1, 170-2 through 170-N are the same, the phase codes to be set at the RF chains 160-1, 160-2 through 160-N to change the beam direction to the specific direction may be uniquely determined based on the corresponding direction. Hence, the phase codes which are set per direction may be referred to as a phase pattern. If the phase codes are set at the RF chains 160-1, 160-2 through 160-N, depending on a designated pattern, the communication device including the phased-array antenna 150 may form the beam of an intended direction, or steer the beam through the phased-array antenna 150.

In the frequency band for the 5G communication, a beamforming/beam steering technique using a multi-chain RF phased-array element is used to maximize and/or increase high transmit equivalent isotropic radiated power (EIRP) and receive sensitivity. In so doing, an error may occur in the gain and the phase between the chains in the phased-array RFIC, due to variation between semiconductor processes, variation which may occur in assembling parts and a design program. This error causes TX/RX total gain reduction, reduction in total Tx power (TRP), reduction in EIRP, reduction in RX sensitivity, beam direction error, beam deformation, and side-lope reduction degradation.

Characteristics of the gain and the phase of the path (e.g., the channel) may be analyzed with the help of separate equipment outside the phased-array RFIC, but there is difficulty in considerable time required, high measurement cost, and real-time correction during the operation. Hence, a circuit configuration and an apparatus for relatively or absolutely detecting the characteristics of the gain and the phase of each path are required in the phased-array RFIC, and it is necessary to correct each path through self-calibration through this structure.

To address the aforementioned problems, the present disclosure provides an apparatus and a method for relatively detecting gain and phase characteristics of an RF chain or path (e.g., channel) in a phased-array RFIC. The RF phased-array transceiver IC may implement (e.g., 2×4 arrays, 2×8 arrays, 2×16 arrays) a path (or dual stream) for independent dual polarizations in one RFIC, and have paths for two independent input or output signals (e.g., the RF or the IF). One path of TX/RX paths configured in a plurality of RF chains of the independent paths in the paths for two polarizations of one RFIC may be defined as a reference path, and errors of the paths may be sequentially detected based on the reference path. Thus, by relatively detecting the gain and phase characteristics in the RF phased-array transceiver IC, the communication device may correct the characteristics of each path of the RF phased-array transceiver IC. Through this calibration, the communication device may maximize and/or increase performance of the RF phased-array transceiver IC. Application methods and their combinations adopting a connection method at an RF front-end (FE) for connections between adjacent paths, a connection structure through a coupling (e.g., capacitive coupling, resistive coupling) scheme and a direction connection scheme, an algorithm for error detection, and the polarization based calibration structure according to an example embodiment of the present disclosure may be included as example embodiments of the present disclosure.

Prior to describing the polarization based calibration according to an embodiment of the present disclosure, a conventional method for performing calibration in a multiple phased-array circuit/antenna is described as follows. For example, the multiple phased-array circuit may receive a signal transmitted from an antenna array through one receive antenna and measuring device (may be referred to as a far field), analyze the gain and the phase of each RF chain based on received information, and perform the calibration. Yet, this method may configure the far field and thus perform the calibration, wherein a physical scale of the measurement system increases, the calibration may not be performed in real time while operating the multiple phased-array circuit, and it is difficult to apply depending on a surrounding environment change (e.g., temperature change, mechanical change, air environment change, the number of chains and RFICs, part aging, etc.). As another example, there is a method for transmitting and receiving a signal using near field characteristics of an antenna, and performing calibration by analyzing the signal, by applying to a plurality of circuits or independent multiple stream paths to address no error detection in gain and phase during the operations according to the above method. This method may be immediately applied during the operation, but it is difficult to analyze characteristics of the near field between the RFICs or the stream paths, and there may be difficulty in accurate application because frequency spectral characteristics between cross-polarization are not constant. To address the shortcomings of the conventional schemes, the present disclosure describes an apparatus and a method for correcting a gain error and a phase error in real time during operations, and achieving miniaturization of products such as an RFIC and an electronic device including the same, by performing polarization based calibration.

Figure 2:
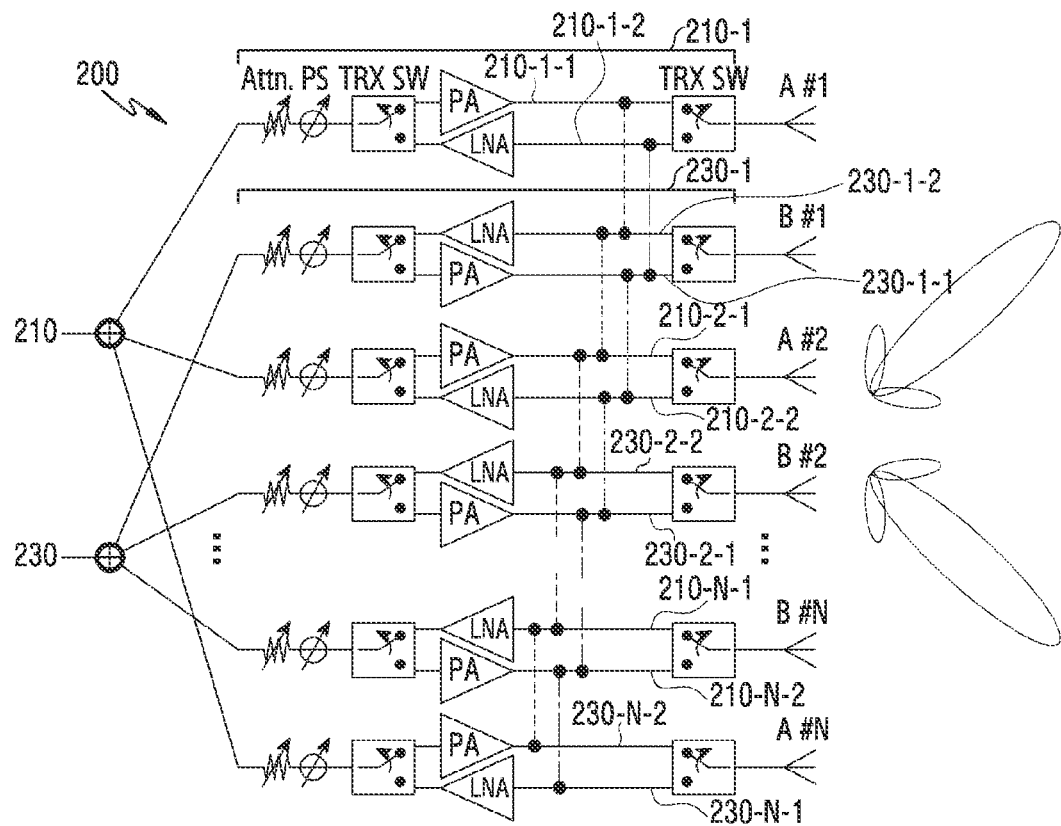
FIG. 2 is a diagram illustrating an example of polarization based calibration in a phased-array antenna according to various embodiments.

FIG. 2 is a diagram illustrating an example of polarization based calibration in a phased-array antenna according to various embodiments. A configuration of a calibration circuit 200 shown in FIG. 2 is merely an example provided for convenience of explanation, and the structure of the present disclosure is not limited thereto.

Referring to FIG. 2, the calibration circuit 200 may include a first stream path 210 and a second stream path 230. The first stream path 210 may transmit and receive a first signal having first polarization, and the second stream path 230 may transmit and receive a second signal having second polarization. For example, if the first polarization has polarization of +45°, the second polarization may have polarization of −45°. Herein, components for the first polarization and the second polarization may be understood as co-polarization components. However, the present disclosure is not limited thereto, and the first signal having the first polarization and the second signal having the second polarization may be formed as the same signals. In addition, the aforementioned polarization may indicate a data stream or a stream. Hereafter, the word polarization described in the present disclosure may be understood as the data stream or the stream, and it will be understood that the present disclosure is limited thereto.

In addition, the first stream path 210 and the second stream path 230 may indicate paths for independent input/output. For example, the first stream path 210 may indicate a path for transmission, and the second stream path 230 may indicate a path for reception. As another example, the second stream path 230 may indicate a path for transmission, and the first RF path 210 may indicate a path for reception.

According to an embodiment, the first stream path 210 may include a plurality of RF paths connected through a combiner, and the second stream path 230 may include a plurality of RF paths. For example, the first stream path 210 may include a first RF path 210-1 through an N-th RF path 210-N (wherein, N is a positive integer greater than 2), and the second stream path 230 may include a first RF path 230-1 through an N-th RF path 230-N (wherein, N is a positive integer greater than 2). In addition, the RF paths each may include a TX path and an RX path. For example, the first RF path 210-1 of the first stream path 210 may include a TX path 210-1-1 and an RX path 210-1-2. Also, for example, the first RF path 230-1 of the second stream path 230 may include a TX path 230-1-1 and an RX path 230-1-2. Herein, the TX path may be referred to as a TX channel, and the RX path may be referred to as an RX channel According to an embodiment, one RF path may include a plurality of RF components. For example, the first RF path 210-1 of the first stream path 210 may include an attenuator (attn), a phase shifter (PS), at least one TRX switch (SW), a power amplifier (PA) and a low noises amplifier (LNA). Herein, the TX path 210-1-1 included in the first RF path 210-1 may include the attn, the PS, the at least one TRX SW and the PA, and the RX path 210-1-2 may include the attn, the PS, the at least one TRX SW and the LNA. The plurality of the RF paths 210-2 through 210-N or 230-2 through 230-N included in the first stream path 210 and the second stream path 230 each may include the RF components as mentioned above. However, the present disclosure is not limited thereto, and it is merely an example provided for convenience of explanation. For example, each RF path may further include other RF component, or may not include some.

According to an embodiment, one TX path of the first stream path 210 and one RX path of the second stream path 230 may be electrically connected. For example, the TX path 210-1-1 of the first RF path 210-1 of the first stream path 210 and the RX path 230-1-2 of the first RF path 230-1 of the second stream path 230 may be electrically connected. Also, for example, the TX path 210-2-1 of the second RF path 210-2 of the first stream path 210 and the RX path 230-1-2 of the first RF path 230-1 of the second stream path 230 may be electrically connected. Also, for example, the TX path 210-2-1 of the second RF path 210-2 of the first stream path 210 and the RX path 230-2-2 of the second RF path 230-2 of the second stream path 230 may be electrically connected. As described above, the TX path 210-N-1 of the N-th RF path 210-N of the first stream path 210 and the RX path 230-N-2 of the N-th RF path 230-N of the second stream path 230 may be electrically connected. In addition, one RX path of the first stream path 210 and one TX path of the second stream path 230 may be electrically connected. For example, the RX path 210-1-2 of the first RF path 210-1 of the first stream path 210 and the TX path 230-1-1 of the first RF path 230-1 of the second stream path 230 may be electrically connected. Also, for example, the RX path 210-2-2 of the second RF path 210-2 of the first stream path 210 and the TX path 230-1-1 of the first RF path 230-1 of the second stream path 230 may be electrically connected. Also, for example, the RX path 210-2-1 of the second RF path 210-2 of the first stream path 210 and the TX path 230-2-1 of the second RF path 230-2 of the second stream path 230 may be electrically connected. As described above, the RX path 210-N-2 of the N-th RF path 210-N of the first stream path 210 and the TX path 230-N-1 of the N-th RF path 230-N of the second stream path 230 may be electrically connected. The RX or TX path of another RF path (e.g., the second stream path 230) adjacent to the TX or RX path of one stream path (e.g., the first stream path 210) may be sequentially connected as stated above. In so doing, a connection structure for sequentially connecting different paths may include a transmission line and at least one switch. Details of the connection structure shall be explained in FIG. 4.

According to an embodiment, connection of one TX path of the first stream path 210 and one RX path of the second stream path 230 may indicate connection between one points on the RF path. For example, an output stage of the power amplifier on the TX path 210-1-1 in the first RF path 210-1 of the first stream path 210 and an input stage of the low noise amplifier on the RX path 230-1-2 in the first RF path 230-1 of the second stream path 230 may be connected. In addition, connection of one RX path of the first stream path 210 and the TX path of the second stream path 230 may indicate connection between one points on the RF path. For example, an input stage of the low noise amplifier on the RX path 210-1-2 in the first RF path 210-1 of the first stream path 210 and an output stage of the power amplifier on the TX path 230-1-1 in the first RF path 230-1 of the second stream path 230 may be connected. Yet, the present disclosure is not limited thereto. It indicates the connection between one points on the RF paths as described above, and one TX path and one RX path may be electrically connected.

Figure 3:
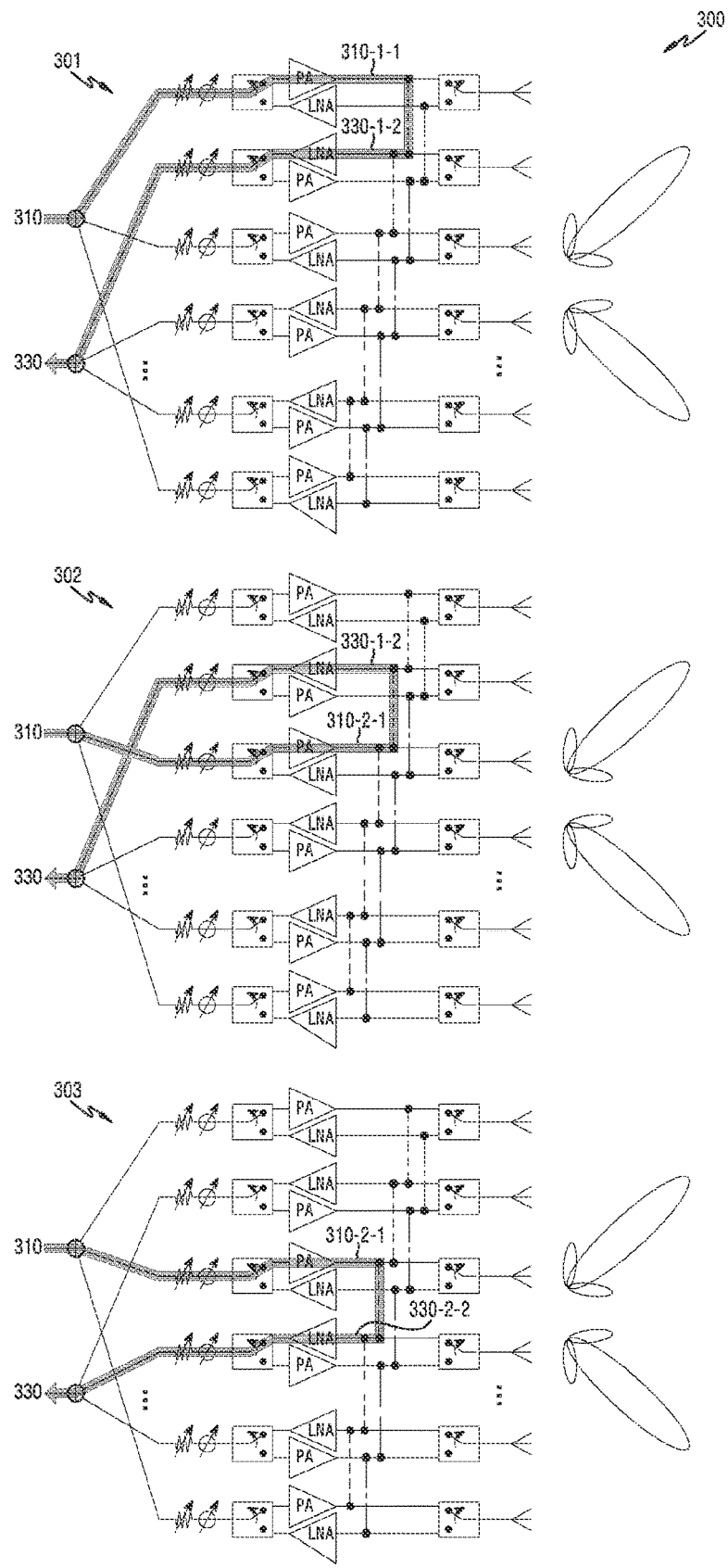
FIG. 3 is a diagram illustrating an example of sequential polarization based calibration according to various embodiments.

If the polarization based calibration circuit 200 according to an embodiment of the present disclosure is included, relative gain and phase differences between two adjacent RF paths may be obtained. According to an embodiment, the calibration circuit 200 may sequentially analyze all the other RF paths based on one reference RF path (e.g., the first RF path 210-1 of the first stream path 210). Also, according to an embodiment, the calibration circuit 200 may jointly analyze all the other RF paths, by applying the gain and the phase having orthogonality with a modulation signal. The polarization based calibration circuit 200 according to an embodiment of the present disclosure is the structure for performing the calibration in real time during the operation, and sequentially connecting the RF paths disposed in the phased-array RFIC, and may be applied regardless of the surrounding environment change (e.g., temperature change, mechanical change, air and environment change, part aging, etc.). In addition, the calibration circuit 200, which may be applied without changing a condition for a load of a transmitting stage and a condition for a source of a receiving stage, may be configured merely with minimum change in an existing circuit. Further, non-linear characteristics of the TX phased-array system may be received in the RX path having linear characteristics and modulation (e.g., AM-AM, AM-PM) characteristics of the TX path may be analyzed in real time through a closed loop, which may also be applied to digital predistortion. FIG. 3 describes an example sequential calibration process of the calibration circuit 200.

FIG. 3 is a diagram illustrating an example of sequential polarization based calibration according to various embodiments. The sequential polarization based calibration indicates a calibration process for forming a plurality of independent loops by sequentially connecting a TX or RX path of a first stream having specific polarization and an RX or TX path of a second stream path, sequentially inputting and outputting a signal to each loop, and thus detecting and correcting characteristics (e.g., a gain and a phase) of the TX path and the RX path of each loop. Advantages in performing the sequential polarization based calibration, using the independent paths, do not require an additional circuit (e.g., an IQ detector, an analog/digital detection circuit) in the RFIC, and may not considerably affect the performance of the circuit which is operating. In addition, a separate external device for analyzing the characteristics of the paths is not needed, and sizes of the RFIC and the electronic device may be miniaturized.

A calibration circuit 300 of FIG. 3 may be understood the same as or similar to the calibration circuit 200 of FIG. 2. For example, in the calibration circuit 300 of operation 301, a TX path 310-1-1 may be understood the same as or similar to the TX path 210-1-1 of the calibration circuit 200 of FIG. 2. Hereafter, repeated descriptions of FIG. 2 may not be repeated in the description of FIG. 3.

An operation process of the sequential calibration of the electronic device including the calibration circuit 300 is as follows. Referring to the operation 301, a test signal may be applied through a first stream path of the calibration circuit 300, and an output of the input test signal may be obtained through a second stream path. The test signal may indicate any signal of which signal characteristics (e.g., amplitude, phase, etc.) are already known. The electronic device may obtain the characteristics of the gain and the phase of the TX path 310-1-1 of the first RF path of the first stream path and an RX path 330-1-2 of the first RF path of the second stream path. The TX path 310-1-1 of the first stream path and the RX path 330-1-2 of the second stream path may be determined as a reference path. The reference path may indicate a reference path for detecting errors in the gain and phase characteristics of the other paths.

In operation 302, the electronic device may measure gains and phases of a TX path 310-1-2 of a second RF path of the first stream path and the RX path 330-1-2 of the first RF path of the second stream path, in the same manner or similar as the operation 301. The RX path 330-1-2 of the reference path obtained in operation 301 may be a common path, and the characteristics (e.g., the gain and the phase) of the TX path 310-1-1 of the first RF path and the TX path 330-2-1 of the second RF path of the first stream path may be separated based on the RX path 330-1-2. In so doing, since the TX path 310-1-1 is the reference path obtained in operation 301, a difference between the characteristics of the TX path 310-1-1 of the first RF path and the TX path 310-2-1 of the second RF path of the first stream path may indicate an error value. The obtained error value may be corrected through a subsequent calibration process. In operation 303, the electronic device may measure gains and phases of a TX path 310-2-1 of the second RF path of the first stream path and an RX path 310-2-2 of the second RF path of the second stream path. In addition, based on the TX path 310-2-1 of the second RF path of the first stream path obtained in operation 302, the characteristics (e.g., the gain and the phase) of the RX path 330-1-2 of the first RF path and the RX path 330-2-2 of the second RF path of the second stream path may be separated. In so doing, since the TX path 310-2-1 is the path obtained in operation 301 and operation 302 and its error is known based on the reference paths, a difference between the characteristics of the RX path 330-1-2 of the first RF path and the RX path 330-2-2 of the second RF path of the second stream path may indicate an error value. The obtained error value may be corrected through a subsequent calibration process. By performing the error detection sequentially on all the paths of the other RF paths in operations 301 through 303 as stated above, the electronic device may acquire the gain error and the phase error of all the RF paths, and correct the errors by performing the calibration based on the obtained errors.

Figure 4:
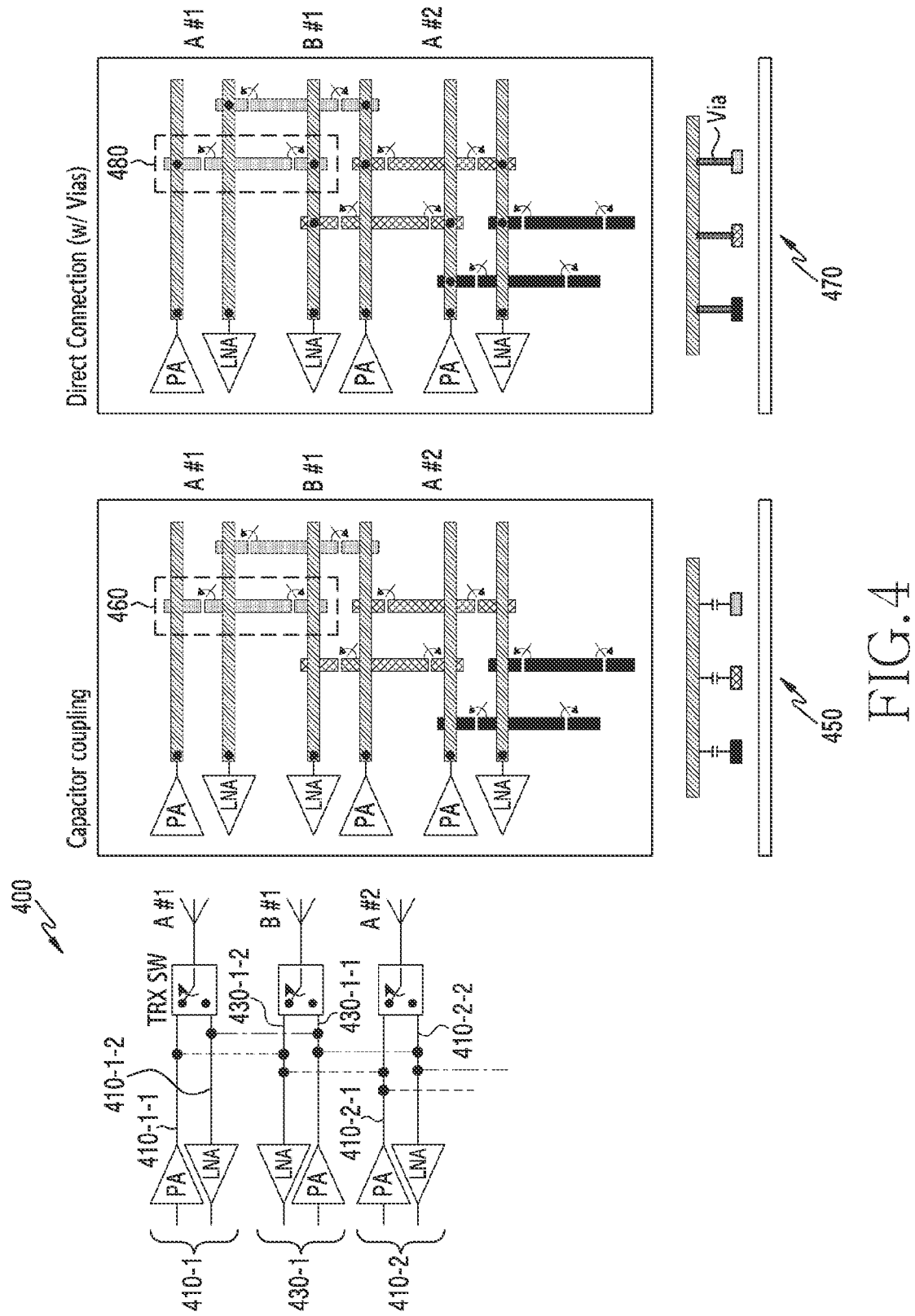
FIG. 4 is a diagram illustrating an example circuit structure of sequential polarization based calibration according to various embodiments.

FIG. 4 is a diagram illustrating an example circuit structure of polarization based calibration according to various embodiments. FIG. 4 shows a connection structure of the polarization based calibration according to various embodiments of the present disclosure. A calibration circuit 400 of FIG. 4 may be understood to be the same as or similar to the calibration circuit 200 of FIG. 2. For example, a first RF path 410-1 of a first stream path of the calibration circuit 400 may be understood to be the same as or similar to the first RF path 210-1 of the first stream path of the calibration circuit 200. Hereafter, repeated descriptions of FIG. 2 may not be repeated in FIG. 4.

Referring to the calibration circuit 400, a TX or RX path of one stream path (e.g., a first stream path) may be electrically connected with an RX or TX path of another stream path (e.g., a second stream path) by a connection structure. For example, the connection structure may include an indirect connection structure 460 indirectly connected by coupling or a direct connection structure 480 directly connected through vias.

Referring to 450, the indirect connection structure 460 may include a transmission line and at least one switch. According to an embodiment, the transmission line of the indirect connection structure 460 may be disposed in an adjacent area of a TX path (e.g., a TX path 410-1-1) and an RX path (e.g., an RX path 430-1-2) for connection to form capacitance due to the coupling, and thus electrically connect the TX path and the RX path. In addition, the at least one switch may be connected with the transmission line in series, in parallel, or in a combination of series and parallel. For example, if the indirect connection structure 460 includes only one switch, the switch may be connected with the transmission line in parallel or in series. As another example, if the indirect connection structure 460 includes two or more switches, some of the switches may be connected in series, and the other some may be connected in parallel with the transmission line. According to an embodiment, the electronic device may change a mode, through the at least one switch included in the indirect connection structure 460. For example, if the at least one switch is off, the electronic device may transmit and receive an RF signal processed at the phased-array RFIC to and from another electronic device. Also, for example, if the at least one switch is on, the electronic device may detect gain and phase errors of the RF paths in the phased-array RFIC, and correct the errors of the RF paths based on the detected errors.

Referring to 470, the direct connection structure 480 may include a transmission line, at least one switch and at least one via or a conductive member (e.g., a metal line). According to an embodiment, the transmission line of the direct connection structure 480 may directly connect the TX path (e.g., the TX path 410-1-1) and the RX path (e.g., the RX path 430-1-2) for connection through the vias. According to an embodiment, the transmission line of the direct connection structure 480 may directly connect the TX path (e.g., the TX path 410-1-1) and the RX path (e.g., the RX path 430-1-2) for connection through the conductive member (e.g., the metal line). In addition, the at least one switch may be connected with the transmission line in series, in parallel, or in a combination of series and parallel. For example, if the direct connection structure 480 includes only one switch, the switch may be connected with the transmission line in parallel or in series. As another example, if the direct connection structure 480 includes two or more switches, some of the switches may be connected in series, and the other some may be connected in parallel with the transmission line. According to an embodiment, the electronic device may change the mode, through the at least one switch included in the direct connection structure 480. For example, if the at least one switch is off, the electronic device may transmit and receive an RF signal processed at the phased-array RFIC to and from another electronic device. Also, for example, if the at least one switch is on, the electronic device may detect the gain and phase errors of the RF paths in the phased-array RFIC, and correct the errors of the RF paths based on the detected errors.

In FIG. 4, the connection structure for connecting the TX or RX path of one stream path (e.g., the first stream path) and the RX or TX path of the another stream path (e.g., the second stream path) has been described by distinguishing the indirect connection structure 460 and the direct connection structure 480. However, the polarization based calibration circuit according to an embodiment of the present disclosure does not refer, for example, to each connection structure being connected independently. For example, the TX path and the RX path may be connected through the indirect connection structure in some RF path of the polarization based calibration circuit according to an embodiment of the present disclosure and through the direct connection structure in some other RF path. As another example, in connecting one RX path and one TX path, they may be connected through the indirect connection structure at one point, and may be connected through the direct connection structure at another point.

Figure 5:
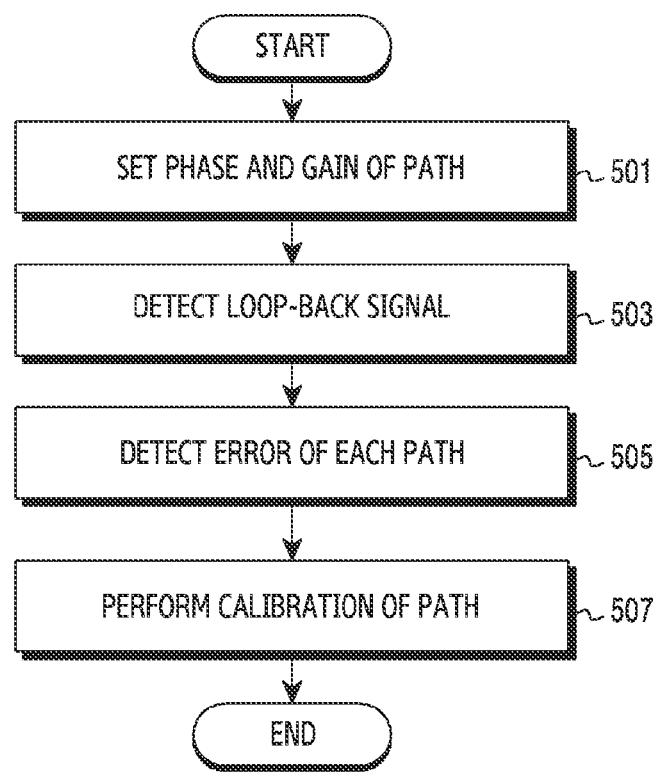
FIG. 5 is a flowchart illustrating example operations of an electronic device according to sequential polarization based calibration according to various embodiments.

FIG. 5 is a flowchart illustrating example operations of an electronic device according to sequential polarization based calibration according to various embodiments. FIG. 5 is a flowchart in which the electronic device performs the sequential calibration on paths, in the electronic device including the calibration circuit 200 of FIG. 2.

Referring to FIG. 5, according to an embodiment, in operation 501, the electronic device may set the phase and the gain of the path. For example, the electronic device may set the phase and the gain of every path for status measurement. The paths may indicate paths for the status measurement. For example, referring to FIG. 2, the paths may indicate at least a part of the TX paths and the RX paths included in the first stream path and the second stream path.

In operation 503, the electronic device may detect a loop-back signal. For example, the electronic device may apply a test signal to the transmitting stage (e.g., the first stream path or the second stream path) by sequentially activating loop-back paths (e.g., turning on at least one switch of the connection structure), and accordingly detect the loop-back signal output to the receiving stage (e.g., the second stream path or the first stream path which is the path determined in response to the transmitting stage) through a loop-back path. The loop-back path may indicate a path connected with the TX path and the RX path. For example, referring to FIG. 2, the loop-back path may indicate the loop to which the TX path of the first RF path of the first stream path and the RX path of the first RF path of the second stream path are connected.

In operation 505, the electronic device may detect errors of the paths respectively. The electronic device may detect the error of each path, based on the phase and gain values which are set per path in operation 501, the loop-back signal detected in operation 503 and the test signal. A method for detecting the error shall be explained in greater detail below with reference to FIG. 6.

In operation 507, the electronic device may perform the calibration of the path. For example, the electronic device may perform the calibration of the paths through the error values per path extracted in operation 505, based on a reference path arbitrarily determined. Herein, the reference path may indicate a reference path for determining the error level with respect to the characteristics (e.g., the gain, the phase) of the other paths.

Figure 6:
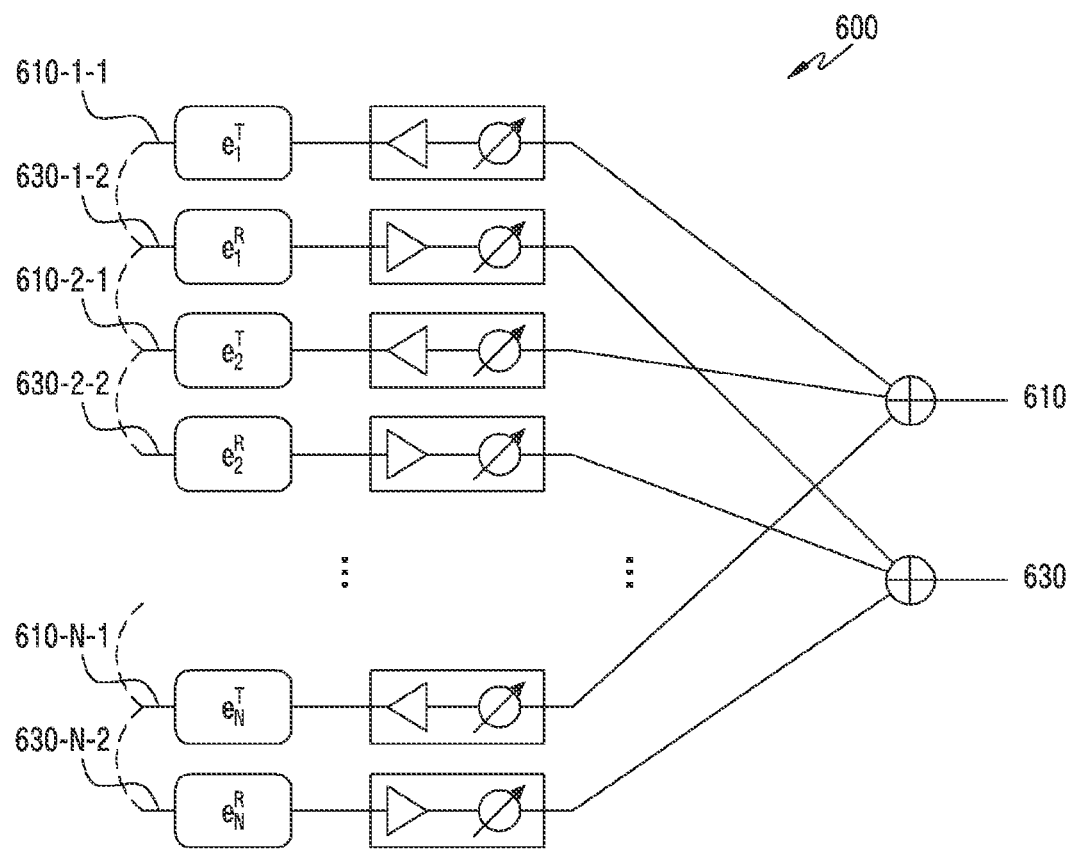
FIG. 6 is a diagram illustrating example operation principles according to sequential polarization based calibration according to various embodiments.

FIG. 6 is a diagram illustrating example operation principles according to sequential polarization based calibration according to various embodiments. FIG. 6 is a simplified diagram of the structure of FIG. 2 provided to explain a method for an electronic device to detect errors of paths respectively in operation 505 of FIG. 5.

Referring to FIG. 6, a calibration circuit 600 may include a first stream path 610 and a second stream path 630. The first stream path 610 may indicate the transmitting stage (or the input stage), and the second stream path 630 may indicate the receiving stage (or the output stage). The first stream path 610 may include a plurality of TX paths 610-1-1 through 610-N-1, and the second stream path may include a plurality of RX paths 630-1-2 through 630-N-2.

According to an embodiment, if a test signal s is applied to the first stream path 610 and the applied test signal is output to the second stream path 630 through a specific loop-back path (a TX path j, an RX path i), a relational expression between the output loop-back signal $y_{ij}$ and the TX path and the RX path included in the specific loop-back path is the following equation.

$$\frac{e_{i+1}^T}{e_i^T} = \frac{y_{ii+1}}{y_{ii}} \cdot \frac{C_i^T}{C_{i+1}^T} \qquad \text{[Equation 1]}$$

$e_i^T$ may denote an error value of the i-th TX (T) path, $y_{ij}$ may denote the loop-back signal output by passing the test signal s through the j-th TX path and the i-th RX path, and $C_i^T$ may denote a correction value of the i-th TX (T) path. For example, $y_{34}$ may indicate a loop-back signal which is the output of the test signal s passing through the fourth TX path and the third RX path, wherein the fourth TX path and the third RX path may indicate the loop-back path.

Referring to the above-stated equation, the error value and the correction value for each TX path may be determined by the reference path. For example, if the reference path is determined to the first TX path, an equation such as $$\frac{e_2^T}{e_1^T} = \frac{y_{12}}{y_{11}} \cdot \frac{C_1^T}{C_2^T}$$

may be derived. At this time, the error value and the correction value for the reference path may be values already known. Accordingly, the error value and the correction value for the second TX path may be determined. Likewise, an equation for the third TX path may be derived as $$\frac{e_3^T}{e_1^T} = \frac{e_2^T}{e_1^T} \cdot \frac{e_3^T}{e_1^T} = \frac{y_{12}}{y_{11}} \cdot \frac{y_{23}}{y_{22}} \cdot \frac{C_1^T}{C_2^T} \cdot \frac{C_2^T}{C_3^T} = \frac{y_{12}}{y_{11}} \cdot \frac{y_{23}}{y_{22}} \cdot \frac{C_1^T}{C_3^T}.$$

The error value and the correction value for the third TX path may be also determined, based on the reference path as mentioned above. Hence, an equation related to the error value and the correction value for the N-th TX path may be determined as $$\frac{e_N^T}{e_1^T} = \frac{y_{12}}{y_{11}} \cdot \frac{y_{23}}{y_{22}} \cdot \ldots \cdot \frac{y_{N-1N}}{y_{N-1N-1}} \cdot \frac{C_1^T}{C_N^T},$$

according to the inductive method, and relative errors of all the TX paths may be detected.

In the same manner as the equation for the TX path, an equation for the RX may be written as the following equation.

$$\frac{e_{i+1}^R}{e_i^R} = \frac{y_{i+1i+1}}{y_{ii+1}} \cdot \frac{C_i^R}{C_{i+1}^R} \qquad \text{[Equation 2]}$$

$e_i^R$ may denote the error value of the i-th RX (R) path, $y_{ij}$ may denote the loop-back signal output by passing the test signal s through the j-th TX path and the i-th RX path, and $C_i^R$ may denote the correction value of the i-th RX (R) path.

In the same manner as described in the above <Equation 1>, the relative error for every RX path may be detected by <Equation 2>, based on the predetermined reference path.

Based on the above-stated equations, the electronic device may detect the errors for the paths respectively in operation 505. In addition, the electronic device may perform the calibration per path in operation 507 based on the detected error.

Figure 7:
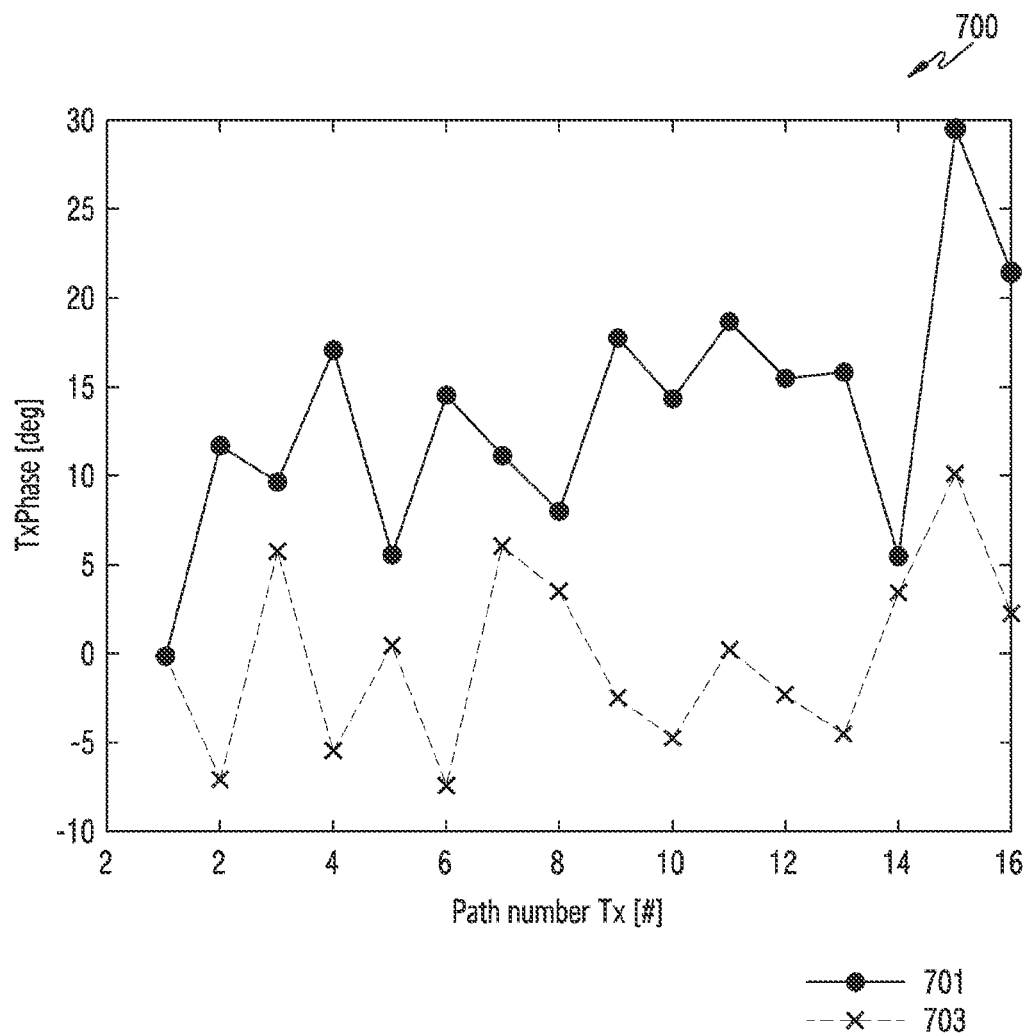
FIG. 7 is a graph illustrating performance according to sequential polarization based calibration according to various embodiments.

FIG. 7 is a graph illustrating performance according to sequential polarization based calibration according to various embodiments. FIG. 7 shows phases of TX paths after the electronic device including the calibration circuit 200 performs the calibration through the method of FIG. 5, if the calibration circuit 200 of FIG. 2 includes 16 TX paths.

Referring to FIG. 7, a horizontal axis of a graph 700 represents the number of the TX paths, and a vertical axis of the graph 700 represents the phase (unit: degree) of the TX paths. The graph 700 snows a first line 701 indicating the phase error of the TX paths each, and a second line 703 indicating the phase error of the TX paths reach after the polarization based calibration according to an embodiment of the present disclosure is performed, if an initial phase value of the 16 TX paths is set to 0°. Since a phase resolution of a phase shifter (e.g., a 4-bit phase shifter) disposed in the calibration circuit used in the graph 700 is 22.5°, it is described that an allowed margin of error of the system (e.g., the calibration circuit or the electronic device including the same) including the phase shifter is 11.25°. Yet, the present disclosure is not limited thereto, and the allowed margin of error may differ, if the phase shifter of other bits is used. For example, in a system using a 6-bit phase shifter, the allowed margin of error may be much smaller.

Referring to the first line 701, the first TX path corresponds to the reference path and the phase error exhibits 0°. Phase error values of the other TX paths represent a value of about 5° through 30°. For example, the phase error value of the fifteenth TX path may be about 30°, and the phase error value of the sixteenth TX path may be about 22°. As described earlier, considering that the allowed range of the phase shifter disposed in the calibration circuit is 11.25°, the first line 701 may form a high error value within the allowed range in some TX paths (e.g., the third and fifth TX paths, etc.), and may form the error value exceeding the allowed range in the most TX paths.

Referring to the second line 703, the phase error values of the paths corrected by the sequential polarization based calibration according to an embodiment of the present disclosure may be formed within the allowed range (e.g., 11.25°) of the phase shifter. For example, the second line 703 may form the phase error value of about −7° through about 10° in the 16 TX paths.

As stated above, the phase error of the TX paths may be controlled, by the sequential polarization based calibration structure and the method thereof according to an embodiment of the present disclosure. The example of the phase error control between the TX paths has been described in FIG. 7, but embodiments of the present disclosure are not limited thereto. According to various embodiments of the present disclosure, the electronic device may correct at least one of the gain error of the TX paths, the gain error of the RX paths, or the phase error of the RX paths, through the calibration.

Figure 8:
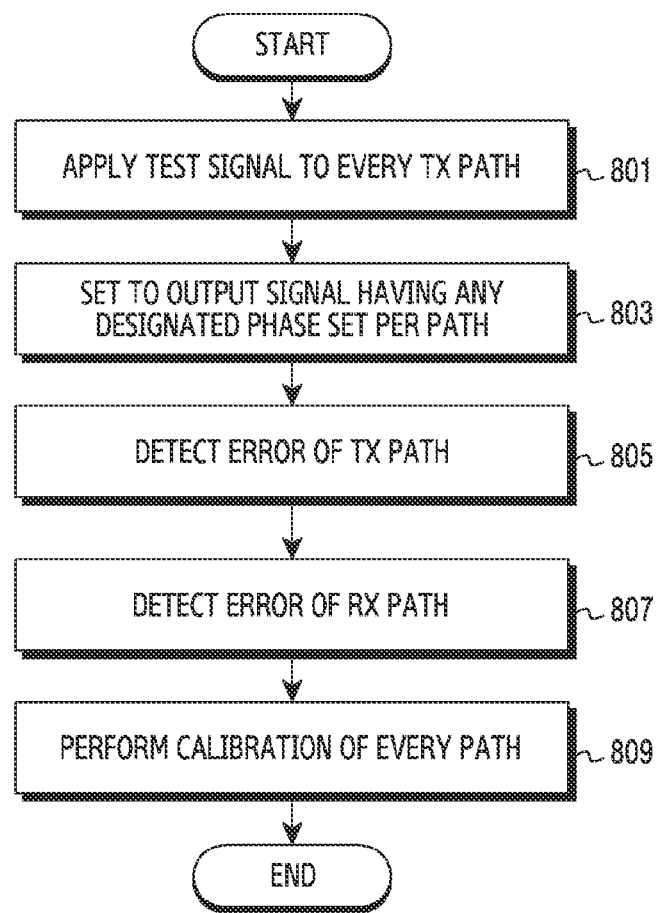
FIG. 8 is a flowchart illustrating example operations of an electronic device according to joint polarization based calibration according to various embodiments.

FIG. 8 is a flowchart illustrating example operations of an electronic device according to joint polarization based calibration according to various embodiments. The joint polarization based calibration indicates a calibration process which forms a plurality of independent loops by sequentially connecting the TX or RX path of the first stream path and the RX or TX path of the second stream path having specific polarizations, connecting every loop and concurrently inputting and outputting a signal to and from every loop, and thus detecting and correcting the characteristics (e.g., the gain and the phase) of the TX path and the RX path of each loop. Advantages in performing the joint polarization based calibration, using the independent paths, do not require an additional circuit (e.g., an IQ detector, an analog/digital detection circuit) in the RFIC, and may not considerably affect the performance of the operating circuit. In addition, the sizes of the RFIC and the electronic device may be miniaturized, without needing a separate external device for analyzing the characteristics of the paths.

FIG. 8 is a flowchart for the electronic device to jointly (or collectively) calibrate the paths, in the electronic device including the calibration circuit 200 of FIG. 2.

Referring to FIG. 8, in operation 801, the electronic device may apply a test signal to all the TX paths. The test signal may indicate any signal of which signal characteristics (e.g., amplitude, phase, etc.) are already known. For example, with all the loop-back paths activated (e.g., with the switch of the connection structure for all the paths turned on), the electronic device may fix the gain and phase values of all the RX paths to any values, and then jointly apply the test signal to all the TX paths.

In operation 803, the electronic device may set to output a signal having any designated phase set per path. For example, the electronic device may set to output the signal having the designated phase set per path, by controlling the phase shifter of the TX paths each. For example, the electronic device may control the phase shifter to output a signal having the phase of 30° for the first TX path, a signal having the phase of 45° for the second TX path, and a signal having the phase of 60° for the N-th TX path.

In operation 805, the electronic device may detect errors of the TX paths. Based on the output signal and the phase set information configured per path in operation 803, the electronic device may detect the errors of the TX paths. In so doing, the method for detecting the error may apply the gain and phase values to be orthogonal to each other with respect every TX path (e.g., first, second, third, . . . , N-th TX paths), repeatedly detect with respect to each time frame, and thus detect the error for the gain and phase values with respect to each TX path.

In operation 807, the electronic device may detect errors of the RX paths. In the same or similar manner as operation 801 through operation 805 as mentioned above, the electronic device may set to fix values of all the TX paths to any value, jointly apply the test signal with respect to all the RX paths and control the phase shifter of each of the RX paths, and thus output a signal having a designated phase set per RX path. Next, the electronic device may detect the errors of the RX channels, based on the output signal and the configured phase set information per path.

In operation 809, the electronic device may perform the calibration of all the paths. Based on the errors of the TX paths detected in operation 805 and the errors of the RX paths detected in operation 807, the electronic device may calibrate all the paths, and thus correct all the paths.

Referring to FIG. 1A, 1B, 2, 3, 4, 5, 6, 7 and FIG. 8 (which may be referred to hereinafter as FIG. 1A through FIG. 8), the polarization based calibration structure and the method provided through this structure according to various embodiments of the present disclosure may self-detect and correct the gain and the phase of each path in the RF phased-array transceiver IC circuit without separate additional equipment. The polarization based calibration structure according to various embodiments of the present disclosure may be configured to successively/sequentially connect the path (or the dual stream) for the dual polarization to the TX path and the RX path of the path for the different polarization through the TX path in one phased-array RFIC. Thus, the gain and phase characteristics of the paths may be detected selectively or jointly.

The polarization based calibration structure and the method provided through this structure according to various embodiments of the present disclosure may have a difference compared with conventional techniques, if having paths (e.g., a first stream path, a second stream path) for two independent inputs and outputs through the dual polarization, by sequentially connecting the RX or TX path of the other stream path in response to the TX or RX path of one stream path. For example, a multiple phased-array structure adopting built-in-self test (BIST) applies an RF injection signal for the measurement inside or outside the RFIC to the chains individually through a coupler overlapped with the transmission line of the receiving stage or the transmitting stage, receives a signal obtained from the TX line stage of the combined chains and the initially applied signal through an I/Q mixer, and thus distinguishes the amplitude and the phase of the signal. A conventional structure may calibrate the gain and the phase of each chain, based on the amplitude and the phase of the acquired signal. However, since this structure is connected with the transmission line of the transmitting or receiving stage by the coupling, inaccuracy (the signal may be applied asymmetrically to each chain and a characteristic difference of each coupler causes an error in the gain characteristic) by the coupling circuit is problematic, and mis-match of the I/Q mixer may also degrade the detection characteristic. The polarization based calibration structure and the method provided through this structure according to various embodiments of the present disclosure do not need to connect an additional circuit (e.g., an I/Q mixer) to separate information of the measured signal, and may minimize and/or reduce the error because the asymmetric signal is not applied to each chain and the same signal is applied sequentially or jointly.

As another example, a structure which adds an I/Q detector to the input/output stage of each chain, additionally disposes an I/Q detector at the common output or input stage, and then applies an LO signal at the same time does not apply an asymmetric signal per chain, and may address the error according to the characteristics of the coupler. However, the I/Q detector needs to be connected to every input and output portion, an additional circuit for the I/Q separate is required, and the circuit is complicated. The polarization based calibration structure and the method provided through the structure according to various embodiments of the present disclosure does not need to connect an additional circuit (e.g., an I/Q mixer) to separate information of the measured signal, and may minimize and/or reduce the error because the asymmetric signal is not applied to each chain and the same signal is applied sequentially or jointly. In addition, the polarization based calibration structure according to various embodiments of the present disclosure may not expand the size of the RFIC where this structure is disposed.

As yet another example, there is a technique for measuring gain and phase errors of paths, by adding a connection structure of a direct λ/4 (herein, λ denotes a signal wavelength) transmission line and a switch at the input and output of each chain, and connecting a calibration block at a common node. Comparing with this structure, the polarization based calibration structure and the method provided through this structure according to various embodiments of the present disclosure may not cause loss (>0.5 dB) by the added transmission line, and may analyze the gain and phase characteristics of the paths with the relatively simple circuit configuration.

In other words, the polarization based calibration structure and the method provided through this structure according to various embodiments of the present disclosure, using the independent paths of the structure including the dual polarization path, do not require an additional circuit (e.g., an IQ detector, an analog/digital detection circuit) in the RFIC, and may not considerably affect the performance of the operating circuit. In addition, the polarization based calibration structure and the method provided through this structure according to various embodiments of the present disclosure may sequentially or jointly detect the characteristics of the paths with accuracy, and miniaturize the sizes of the RFIC and the electronic device, without needing a separate external device for analyzing the characteristics of the paths.

The polarization based calibration structure and the method provided through this structure according to various embodiments of the present disclosure may be used by directly applying to the mm-Wave RF phased-array transceiver IC circuit for 5G communication, and may be applied to beyond 5G, 6G and next generation RFIC circuits and systems. In addition, the polarization based calibration structure and the method provided through this structure according to various embodiments of the present disclosure may be also applied to communication circuit and system (e.g., WLAN of 60 GHz band, wireless HD, fixed wireless access or back-haul communication systems of W- or E-band band, phased array systems for D-band 6G, etc.) configuring a phased-array system by configuring a multi-channel Further, the polarization based calibration structure and the method provided through this structure according to various embodiments of the present disclosure may be also applied to radar and sensor systems (e.g., car radars of 24 GHz, 77 GHz bands, etc.) configuring a phased-array system by configuring a multi-channel Further, the polarization based calibration structure and the method provided through this structure according to various embodiments of the present disclosure may substitute or minimize and/or reduce automatic test equipment (ATE) equipment using built in test equipment, analyze the path characteristics in the RFIC, and accordingly drastically shorten a time for measuring the characteristics of the paths. Further, the polarization based calibration structure and the method provided through this structure according to various embodiments of the present disclosure may perform the detection and the correction regardless of the RFIC performance change (e.g., an external environment change such as medium conditions such as temperature and air) or degradation (e.g., part aging) during the operation.

Figure 9:
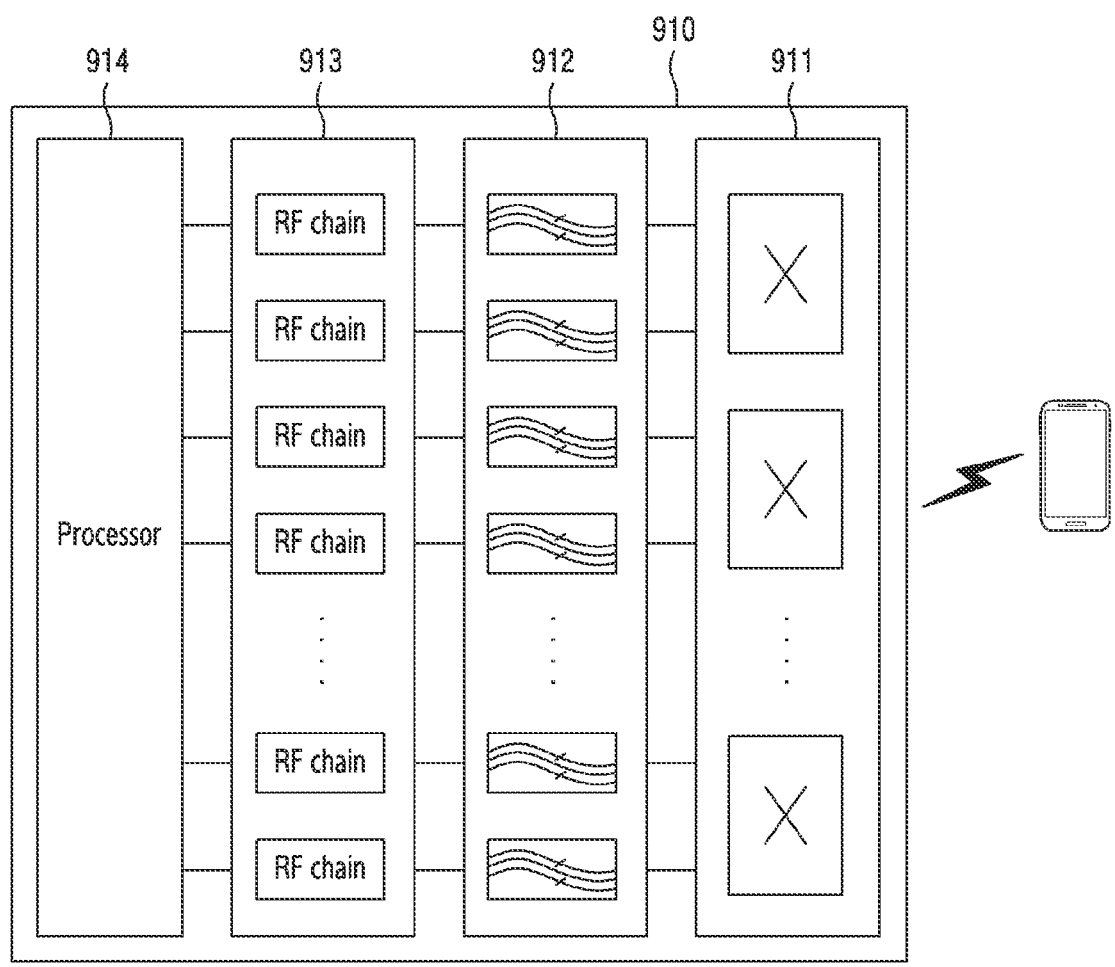
FIG. 9 is a diagram illustrating an example configuration of an electronic device according to various embodiments.

FIG. 9 is a diagram illustrating an example functional configuration of an electronic device according to various embodiments. An electronic device 910 may be one of the base station 110 or the terminal 120 of FIG. 1A. According to an embodiment, the electronic device 910 may be antenna equipment of an RFIC including one or more RF paths in the mmWave band of the base station 110. Not only the RFIC including the stream paths mentioned in FIG. 1A through FIG. 8, but also the electronic device including the same are included in various embodiments of the present disclosure.

Referring to FIG. 4, an example functional configuration of the electronic device 910 is depicted. The electronic device 910 may include an antenna unit (e.g., including at least one antenna) 911, a filter unit (e.g., including at least one filter) 912, an RF processing unit (e.g., including RF processing circuitry) 913, and a control unit (e.g., including processing or control circuitry) 914.

The antenna unit 911 may include a plurality of antennas. The antenna performs functions for transmitting and receiving signals over a radio channel. The antenna may include a conductor formed on a substrate (e.g., a PCB) or a radiator formed in a conductive pattern. The antenna may radiate an up-converted signal or obtain a signal radiated by other device over the radio channel. Each antenna may be referred to as an antenna element or an antenna device. In some embodiments, the antenna unit 911 may include an antenna array in which a plurality of antenna elements forms an array. The antenna unit 911 may be electrically connected with the filter unit 912 through RF signal lines. The antenna unit 911 may be mounted on a PCB including a plurality of antenna elements. The PCB may include a plurality of RF signal lines interconnecting each antenna element and a filter of the filter unit 912. Such RF signal lines may be referred to a feeding network. The antenna unit 911 may provide the received signal to the filter unit 912 or radiate a signal provided from the filter unit 912 over the air.

The filter unit 912 may include at least one filter and perform filtering, to forward a signal of an intended frequency. The filter unit 912 may perform a function for selectively identifying a frequency by forming resonance. The filter unit 912 may include at least one of a band pass filter, a low pass filter, a high pass filter, or a band reject filter. That is, the filter unit 912 may include RF circuits for acquiring a signal of a frequency band for the transmission or a frequency band for the reception. The filter unit 912 according to various embodiments may electrically interconnect the antenna unit 911 and the RF processing unit 913.

The RF processing unit 913 may include various RF processing circuitry including a plurality of RF paths. The RF path may be a unit of the path through which the signal received via the antenna or the signal radiated through the antenna passes. At least one RF path may be referred to as an RF chain. The RF chain may include a plurality of RF elements. The RF elements may include an amplifier, a mixer, an oscillator, a digital-to-analog converter (DAC), an analog-to-digital converter (ADC), and so on. For example, the RF processing unit 913 may include an up converter for up-converting a digital transmit signal of a base band into a transmit frequency, and a DAC for converting the up-converted digital transmit signal to an analog RF transmit signal. The up-converter and the DAC form a part of the TX path. The TX path may further include a PA or a coupler (or a combiner). Also, for example, the RF processing unit 913 may include an ADC for converting an analog RF receive signal to a digital receive signal and a down converter for converting a digital receive signal to a digital receive signal of the base band. The ADC and the down converter form a part of the RX path. The RX path may further include an LNA or a coupler (or a divider). RF parts of the RF processing unit may be implemented on a PCB. The electronic device 910 may include a structure where the antenna unit 911—the filter unit 912—the RF processing unit 913 are layered in order. The antennas and the RF parts of the RF processing unit may be implemented on the PCB, and a plurality of layers may be formed by repeatedly coupling filters between a PCB and a PCB.

The RF processing unit 913 according to various embodiments may include a plurality of RF processing chains for a plurality of signal paths provided to the antenna unit 911, and the filter unit 912. The RFIC for mmWave may include a plurality of RF processing chains. A signal applied in the baseband is input to the RFIC. The signal input to the RFIC is divided to each antenna element. In so doing, for the beamforming, independent phase shift may be applied to each of the antenna elements. Hence, the RFIC may include the plurality of the RF processing chains for processing the signal to be provided to each antenna element. Each RF processing chain may include one or more RF components for the RF signal processing. The RF processing unit 913 may include the polarization based calibration structure according to embodiments of the present disclosure. For example, if the RF processing unit 913 includes two paths (e.g., a first stream path, a second stream path) considering the dual polarization, it may include a connection structure which connects an output stage of a PA disposed on one TX path of the first stream path and an input stage of a LNA disposed on one RX path of the second stream path. Also, for example, it may include a connection structure which connects an input stage of an LNA disposed on one RX path of the first stream path and an output stage of a PA disposed on one TX path of the second stream path.

The control unit 914 may include various control circuitry and control general operations of the electronic device 910. The control unit 914 may include various modules for the communication. The control unit 914 may include at least one processor such as a modem. The control unit 914 may include modules for digital signal processing. For example, the control unit 914 may include a modem. In data transmission, the control unit 914 generates complex symbols by encoding and modulating a transmit bit stream. Also, for example, in data reception, the control unit 914 restores a receive bit stream by demodulating and decoding a baseband signal. The control unit 914 may perform functions of a protocol stack required in a communication standard. The operations performed by the calibration circuit according to various embodiments of the present disclosure may be carried out by the control unit 914. For example, step 501 through step 507 of FIG. 5 may be performed by the control unit 914. As another example, step 801 through step 809 of FIG. 8 may be performed by the control unit 914.

The functional configuration of the electronic device 910 has been described in FIG. 9, as the equipment for including the calibration circuit of the present disclosure. However, the example shown in FIG. 9 is merely an example configuration for utilizing the polarization based calibration structure according to various embodiments of the present disclosure described in FIG. 1A through FIG. 8, and the embodiments of the present disclosure are not limited to the configuration elements of the equipment shown in FIG. 9. The RFIC including the polarization based calibration structure according to various embodiments of the present disclosure, communication equipment of other configurations, a structure itself and the method for performing the calibration through the structure may be also understood as embodiments of the present disclosure.

To explain the polarization based calibration structure and the electronic device including the same, the base station or the base station equipment (e.g., an RU) or an access unit (AU)) for the signa transmission of the mmWave band has been described as an example in the present disclosure, but the embodiments of the present disclosure are not limited thereto. It is noted that wireless equipment for performing the equivalent functions to the base station, wireless equipment (e.g., a TRP) connected with the base station, the terminal 120, or other communication equipment used for the 5G communication are available, as the polarization based calibration structure and the electronic device including the same according to embodiments of the present disclosure.

An electronic device, in a wireless communication system, according to an example embodiment of the present disclosure, may include: a processor, an antenna array, a plurality of first radio frequency (RF) paths related to a first stream, the first RF paths each including a transmit (TX) path and a receive (RX) path, and a plurality of second RF paths related to a second stream, the second RF paths each including a TX path and an RX path, and the processor may be configured to: generate a calibration signal for the antenna array, obtain characteristic information of the antenna array based on a phase difference or a gain difference between one TX path having the first stream and one RX path having the second stream obtained for each of measurement RF paths among the plurality of the first RF paths, and calibrate the plurality of the first RF paths, based on the characteristic information.

In an example embodiment, the processor may be configured to obtain characteristic information of a corresponding measurement RF path according to calibration signals applied sequentially, with respect to each of the measurement RF paths.

In an example embodiment, the processor may be configured to obtain characteristic information of a corresponding measurement RF path according to calibration signals applied jointly, with respect to each of the measurement RF paths.

In an example embodiment, the measurement RF paths may include other paths than a TX path and an RX path corresponding to one stream among the plurality of the first RF path, and the TX path and the RX path corresponding to the one stream may include a reference path.

In an example embodiment, the phase difference or the gain difference may be a difference between the reference path and the measurement RF paths.

In an example embodiment, the processor may be configured to correct the phase difference or the gain difference.

In an example embodiment, the measurement RF paths each may be configured to connect one TX path having the first stream and one RX path having the second stream by a connection structure.

In an example embodiment, the connection structure may include a transmission line and at least one switch.

In an example embodiment, the at least one switch may be connected with the transmission line in series or in parallel.

In an example embodiment, the configuration of the measurement RF paths may be configured by the connection structure directly connecting one TX path having the first stream and one RX path having the second stream through a conductive member or vias, or indirectly connecting through coupling.

A method of operating an electronic device, in a wireless communication system, according to an embodiment of the present disclosure, may include: generating a calibration signal for an antenna array, the antenna array connected with a plurality of first radio frequency (RF) paths related to a first stream and a plurality of second RF paths related to a second stream, the first RF paths each including a transmit (TX) path and a receive (RX) path, the second RF paths each including a TX path and an RX path, obtaining characteristic information of the antenna array based on a phase difference or a gain difference between one TX path having the first stream and one RX path having the second stream obtained for each of measurement RF paths among the plurality of the first RF paths, and calibrating the plurality of the first RF paths based on the characteristic information.

In an example embodiment, obtaining the characteristic information may include obtaining characteristic information of a corresponding measurement RF path according to calibration signals applied sequentially, with respect to each of the measurement RF paths.

In an example embodiment, obtaining the characteristic information may include obtaining characteristic information of each of the measurement RF paths, according to calibration signals applied jointly, with respect to the measurement RF paths.

In an example embodiment, the measurement RF paths may include other paths than a TX path and a RX path corresponding to one stream among the plurality of the first RF path, and the TX path and the RX path corresponding to the one stream may include a reference path.

In an example embodiment, the phase difference or the gain difference may be a difference between the reference path and the measurement RF paths.

In an example embodiment, performing the calibration may include correcting the phase difference or the gain difference.

In an example embodiment, the measurement RF paths each may be configured to connect one TX path having the first stream and one RX path having the second stream by a connection structure.

In an example embodiment, the connection structure may include a transmission line and at least one switch.

In an example embodiment, the at least one switch may be connected with the transmission line in series or in parallel.

In an example embodiment, the configuration of the measurement RF paths may be configured by the connection structure directly connecting one TX path having the first stream and one RX path having the second stream through a conductive member or vias, or indirectly connecting through coupling.

The methods according to the various example embodiments described herein may be implemented in software, hardware, or a combination of hardware and software.

As for the software, a non-transitory computer-readable storage medium storing one or more programs (software modules) may be provided. One or more programs stored in the non-transitory computer-readable storage medium may be configured for execution by one or more processors of an electronic device. One or more programs may include instructions for controlling the electronic device to execute the methods according to the embodiments described in the claims or the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. The program may be stored to a memory combining part or all of those recording media. In addition, a plurality of memories may be included.

The program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the various example embodiments of the present disclosure, the elements included in the present disclosure are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, in a wireless communication system, comprising:
   a processor including processing circuitry;
   an antenna array;
   a plurality of first radio frequency (RF) paths related to a first stream, the first RF paths each comprising a transmit (TX) path and a receive (RX) path; and
   a plurality of second RF paths related to a second stream, the second RF paths each comprising a TX path and an RX path,
   wherein the processor is configured to:
   generate a calibration signal for the antenna array,
   determine characteristic information of the antenna array based on a phase difference or a gain difference between one TX path related to the first stream and one RX path related to the second stream obtained for each of measurement RF paths, and
   calibrate the plurality of the first RF paths, based on the characteristic information,
   wherein the calibration signal is sequentially applied to the measurement RF paths forming RF chains,
   wherein each of two consecutive measured RF chains comprises a common RF path and a non-common RF paths pair, and wherein the common RF path and the non-common RF paths pair have opposite communication directions, and
   wherein the characteristic information for a second non-common RF path of a second RF chain is determined as the phase difference or the gain difference between a first non-common RF path of a first RF chain and the second non-common RF path of the second RF chain.

2. The electronic device of claim 1, wherein the processor is configured to correct the phase difference or the gain difference.

3. The electronic device of claim 1, wherein the measurement RF paths each are configured to connect one TX path having the first stream and one RX path having the second stream by a connection structure.

4. The electronic device of claim 3, wherein the connection structure comprises a transmission line and at least one switch.

5. The electronic device of claim 4, wherein the at least one switch is connected with the transmission line in series or in parallel.

6. The electronic device of claim 3, wherein the measurement RF paths are configured by the connection structure directly connecting one TX path having the first stream and one RX path having the second stream through a conductive member or vias, or indirectly connecting through coupling.

7. A method of operating an electronic device, in a wireless communication system, comprising:
   generating a calibration signal for an antenna array, the antenna array connected with a plurality of first radio frequency (RF) paths related to a first stream and a plurality of second RF paths related to a second stream, the first RF paths each comprising a transmit (TX) path and a receive (RX) path, the second RF paths each comprising a TX path and an RX path;
   determining characteristic information of the antenna array based on a phase difference or a gain difference between one TX path related to the first stream and one RX path related to the second stream obtained for each of measurement RF paths; and
   calibrating the plurality of the first RF paths based on the characteristic information, and
   wherein the calibration signal is sequentially applied to the measurement RF paths forming RF chains,
   wherein each of two consecutive measured RF chains comprises a common RF path and a non-common RF paths pair, and wherein the common RF path and the non-common RF paths pair have opposite communication directions, and
   wherein the characteristic information for a second non-common RF path of a second RF chain is determined as the phase difference or the gain difference between a first non-common RF path of a first RF chain and the second non-common RF path of the second RF chain.

8. The method of claim 7, wherein the calibrating comprises:
   correcting the phase difference or the gain difference.

9. The method of claim 7, wherein the measurement RF paths each connect one TX path having the first stream and one RX path having the second stream via a connection structure.

10. The method of claim 9, wherein the connection structure comprises a transmission line and at least one switch.

11. The method of claim 10, wherein the at least one switch is connected with the transmission line in series or in parallel.

12. The method of claim 9, wherein the measurement RF paths is configured by the connection structure directly connecting one TX path having the first stream and one RX path having the second stream through a conductive member or vias, or indirectly connecting through coupling.

* * * * *